US012738968B2

(12) United States Patent
Wu

(10) Patent No.: US 12,738,968 B2
(45) Date of Patent: Sep. 15, 2026

(54) MOBILE PHONE CASE WITH GYRO FUNCTION

(71) Applicant: Dongni Wu, Shenzhen (CN)

(72) Inventor: Dongni Wu, Shenzhen (CN)

(73) Assignee: Dongni Wu, Shenzhen (CN)

( * ) Notice: Subject to any disclaimer, the term of this patent is extended or adjusted under 35 U.S.C. 154(b) by 455 days.

(21) Appl. No.: 18/332,041

(22) Filed: Jun. 9, 2023

(65) Prior Publication Data

US 2024/0413850 A1 Dec. 12, 2024

(51) Int. Cl.
*H04B 1/3888* (2015.01)
*A63H 33/00* (2006.01)

(52) U.S. Cl.
CPC .......... *H04B 1/3888* (2013.01); *A63H 33/00* (2013.01)

(58) Field of Classification Search
CPC .............................. H04B 1/3888; A63H 33/00
See application file for complete search history.

(56) References Cited

U.S. PATENT DOCUMENTS

2021/0028808 A1* 1/2021 Kim ....................... A45C 11/00

FOREIGN PATENT DOCUMENTS

CN 210469460 U 5/2020
CN 215420375 U 1/2022
CN 216356840 U 4/2022

* cited by examiner

*Primary Examiner* — Yuwen Pan
*Assistant Examiner* — Fatuma G Sherif

(57) ABSTRACT

The present disclosure relates to a mobile phone case with gyro function, including a mobile phone case and a rotating component, wherein the rotating assembly includes a bearing seat, a bearing and a rotating shaft, a through hole is provided at each of the four corners of the mobile phone case, a rotating assembly is provided in each of the through holes, the rotating shafts of two diagonal rotating assemblies coincide, and the rotating assembly is located inside the diagonal of the mobile phone. The bottom surface of the bearing seat is arc-shaped, the outer side surface of the bearing hole is circular and is provided with a groove, an annular boss is provided in a through hole on the mobile phone case, and the bearing seat is clamped in the through hole on the mobile phone case.

5 Claims, 12 Drawing Sheets

MOBILE PHONE CASE WITH GYRO FUNCTION

TECHNICAL FIELD

The present disclosure relates to the technical field of mobile phone accessories, and more particularly to a mobile phone case with gyro function.

BACKGROUND

Generally, a mobile phone case plays a role in protecting a mobile phone. In addition to the function of protecting a mobile phone, the present disclosure is also endowed with interest and playability, which is different from a conventional mobile phone case. The mobile phone case can rotate to play by pressing a rotating fixed point with a finger, and play with one or two hands or play with a countertop rotating to play with a decompression effect, and is expected to become a new form of tidal culture. The application scenario is wide, such as indoor and outdoor, any place that can carry mobile phone.

SUMMARY

The main object of the present disclosure is to provide a mobile phone case with gyro function so as to effectively solve the problems set forth in the background art.

In order to achieve the above object, the present disclosure adopts the following technical solutions: a mobile phone case with gyro function, including a mobile phone case and a rotating assembly, wherein the rotating assembly includes a bearing seat, a bearing and a rotating shaft, wherein the bearing is mounted on the bearing seat, the rotating shaft is mounted in a bearing hole, a through hole is provided at each of four corners of the mobile phone case, a rotating assembly is provided in each of the through holes, the rotating shafts of two rotating assemblies on opposite corners coincide, and the rotating assembly is located at the inner side of the diagonal of the mobile phone.

Preferably, the bottom surface of the bearing seat is arc-shaped close to the corner fillet arc of the mobile phone, the outer side surface of the bearing hole of the bearing seat bottom is circular and is provided with an annular groove, an annular boss is provided in the through hole of the mobile phone case, and the groove of the outer side surface of the bearing seat is clamped on the annular boss in the through hole of the mobile phone case.

Preferably, the rotating shaft is divided into an upper rotating shaft and a lower rotating shaft, the top surface of the upper rotating shaft is a spherical concave boss, the centre of the back surface of the spherical concave boss is provided with a bearing shaft, and the periphery of the bearing shaft is provided with a groove A: the top surface of the lower rotating shaft is a hemisphere, a bearing shaft is provided at the centre of the bottom surface of the hemisphere, a groove B is provided around the bearing shaft, and the inner diameters of the groove A and the groove B are both greater than the outer diameter of the bearing.

Preferably, an intersection point of the rotating shaft centre line of the rotating assembly and the mobile phone case is at any one of the top and bottom surfaces of the mobile phone case and a corner portion.

In use, when the mobile phone case is placed in a vertical diagonal direction, the lower hand or other object is placed against it, the upper hand is pressed and fixed by finger, the finger is used to give a rotational force to the mobile phone, so that the mobile phone is stopped after rotating for several turns, or the upper finger is continuously swung to give it a permanent rotational force to realize cyclic rotation, or the playing is performed by rotating the table, so that the effect of playing the top can be achieved.

Advantageous effects of the present disclosure are: giving enjoyment and playability to mobile phones and providing a new way of entertainment.

BRIEF DESCRIPTION OF DRAWINGS

In FIGS. 1-10, mobile phone case 1, upper rotating assembly right piece 2, upper rotating assembly left piece 3, lower rotating assembly right piece 4, bearing seat 5, bearing 6, upper rotating shaft 7, lower rotating shaft 8, lower rotating assembly left piece 9.

DETAILED DESCRIPTION OF THE EMBODIMENTS

Hereinafter, the embodiments of the present disclosure will be described clearly and completely with reference to the embodiments of the present disclosure. It is to be understood that the described embodiments are only a few, but not all embodiments of the present disclosure. Based on the embodiments of the present disclosure, all other embodiments obtained by a person of ordinary skill in the art without inventive effort fall within the scope of the present disclosure.

Figure 1:
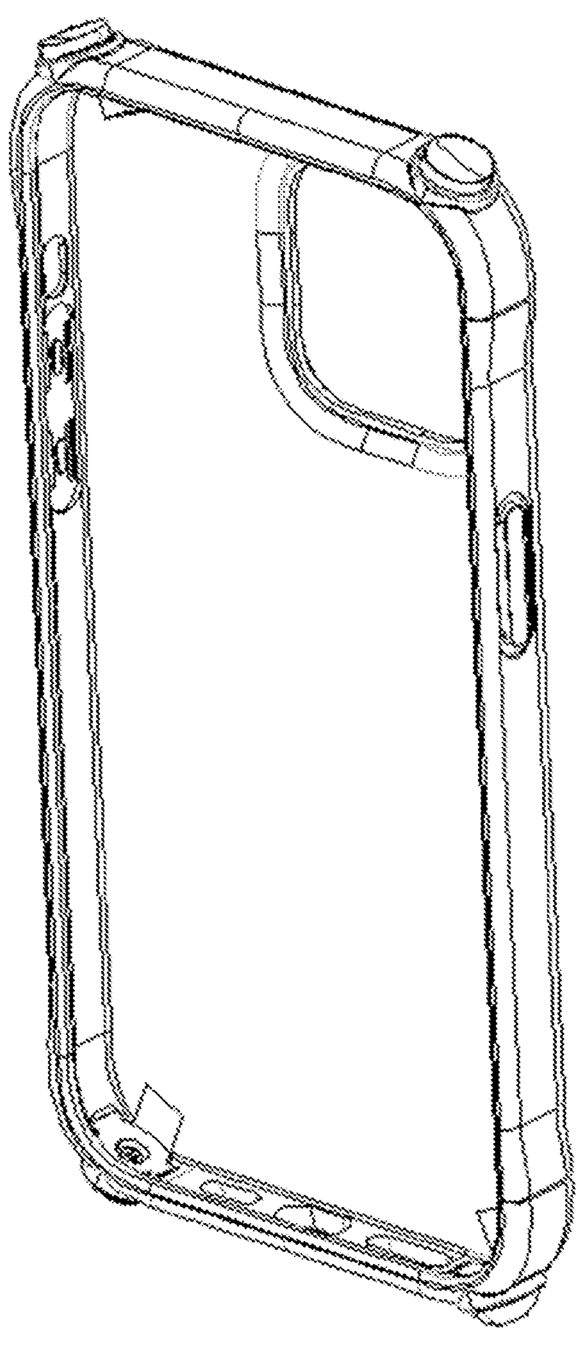
FIG. 1 is a schematic perspective view of the present disclosure.
Figure 2:
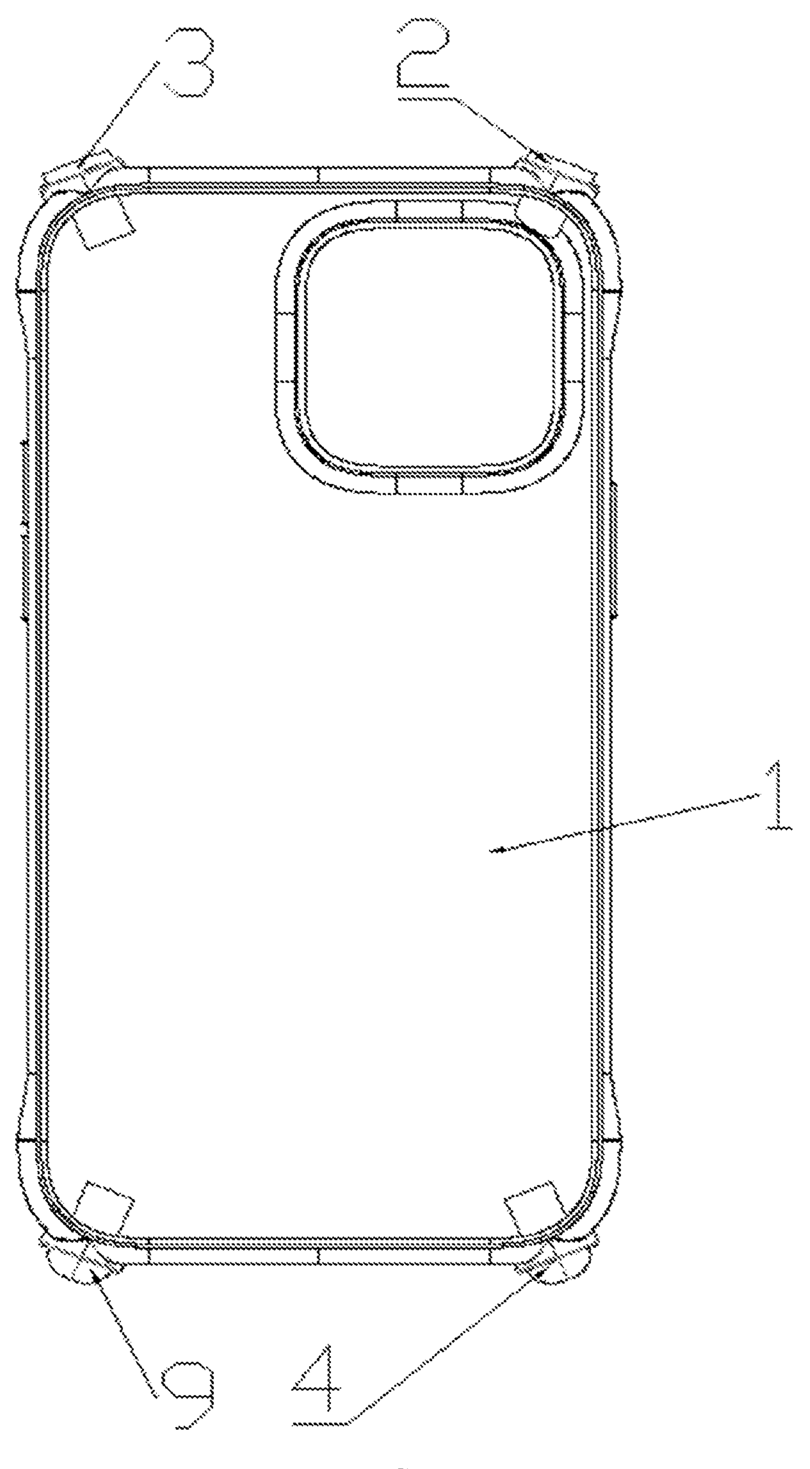
FIG. 2 is a front view of the present disclosure.
Figure 3:
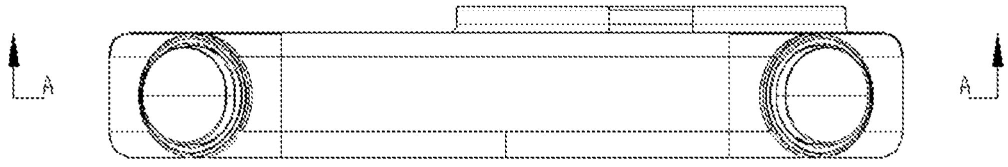
FIG. 3 is a top view of FIG. 2.
Figure 4:
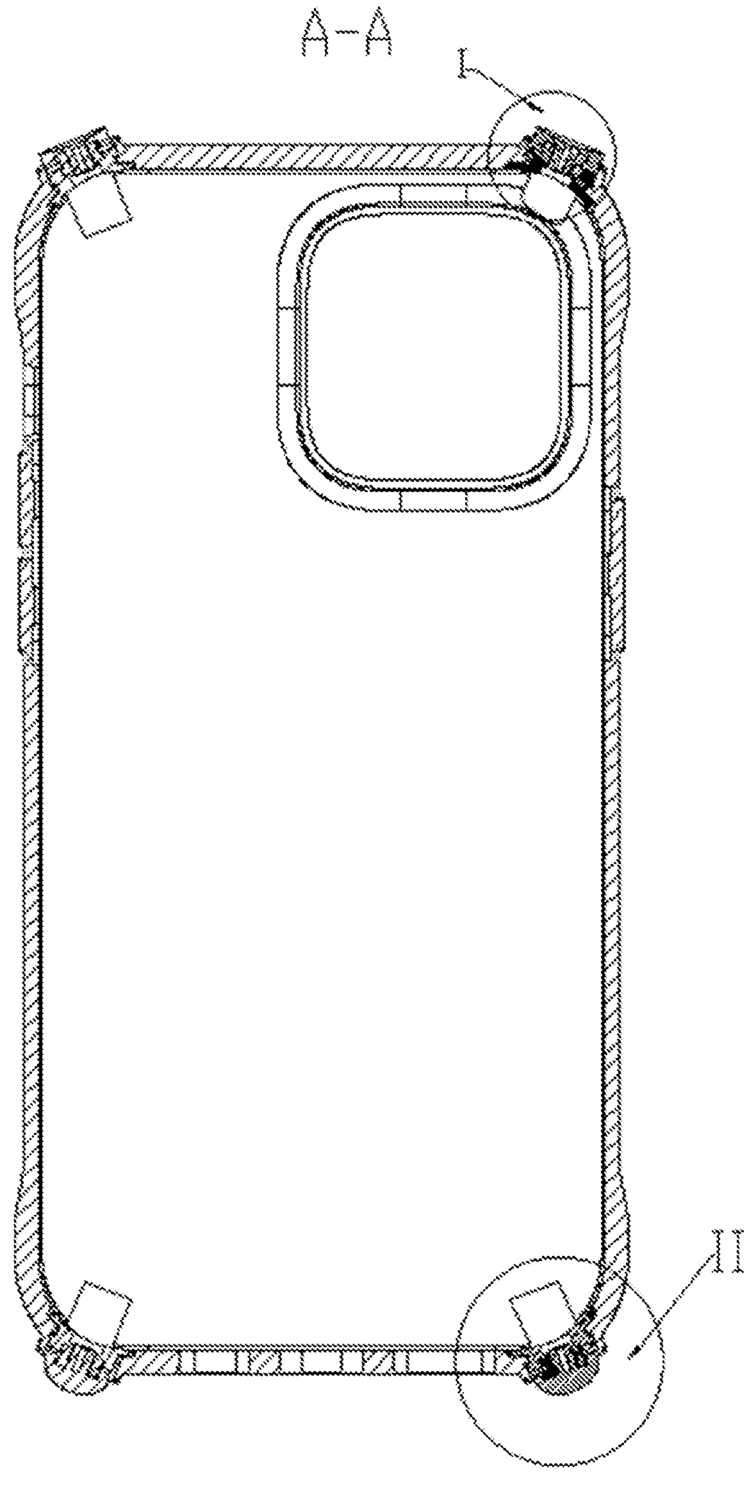
FIG. 4 is a sectional view A-A of FIG. 3.
Figure 5:
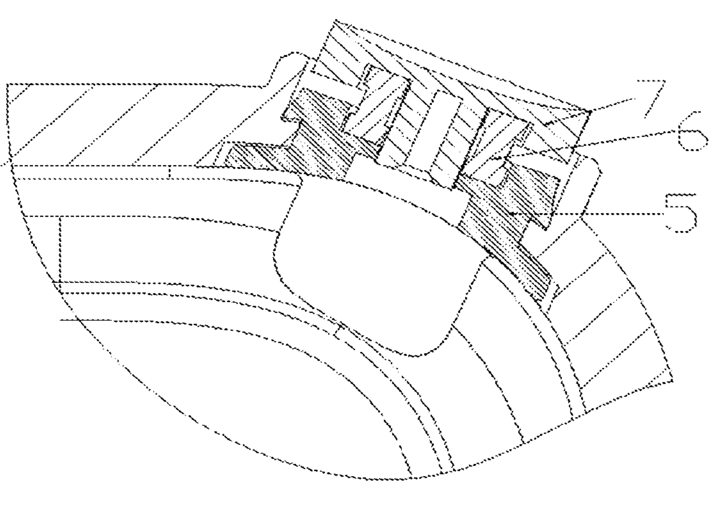
FIG. 5 is an enlarged view I of FIG. 4.
Figure 6:
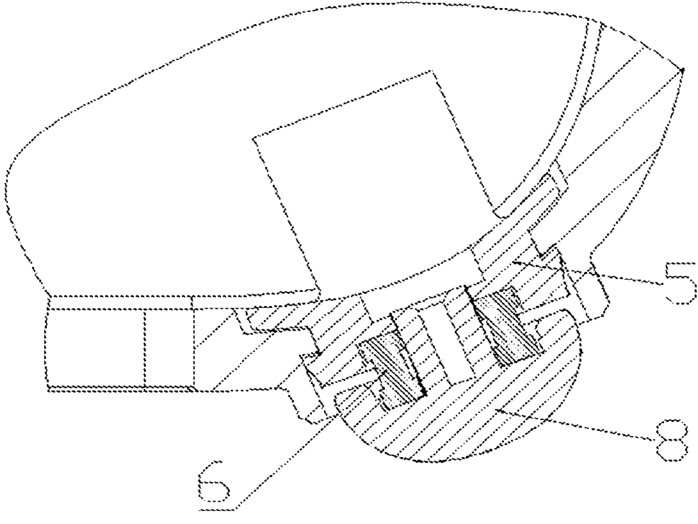
FIG. 6 is an enlarged view II of FIG. 4.
Figure 7:
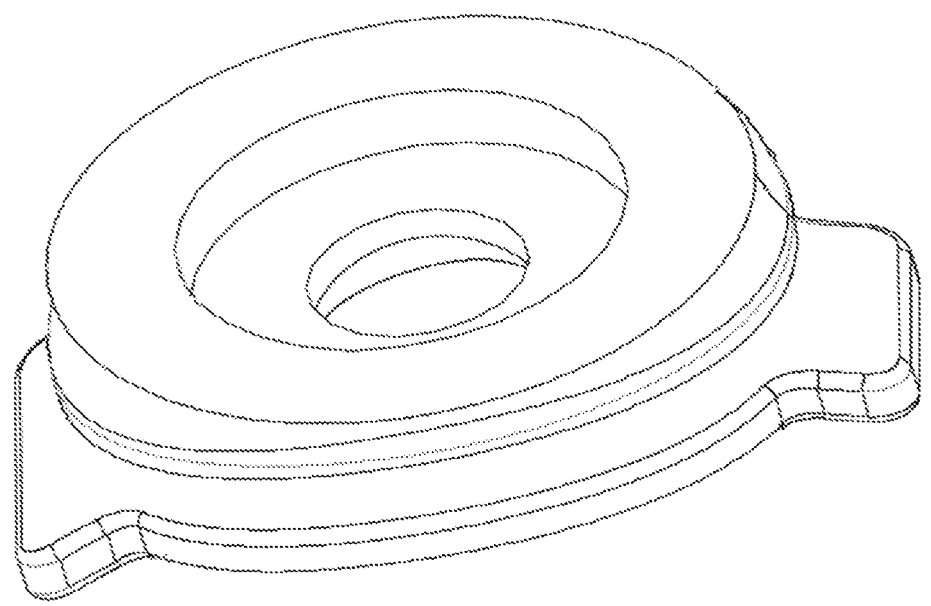
FIG. 7 is a schematic perspective view of the bearing seat of the present disclosure.
Figure 8:
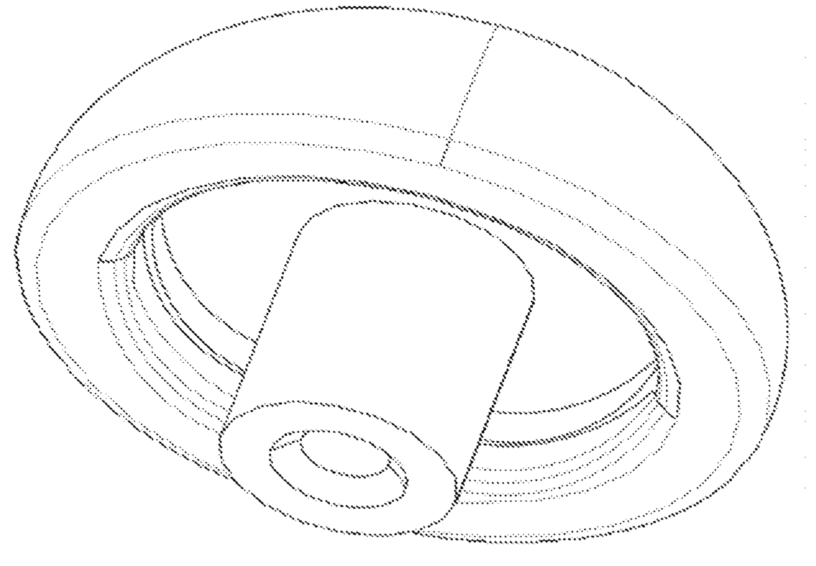
FIG. 8 is a schematic perspective view of a lower rotating shaft of the present disclosure.
Figure 9:
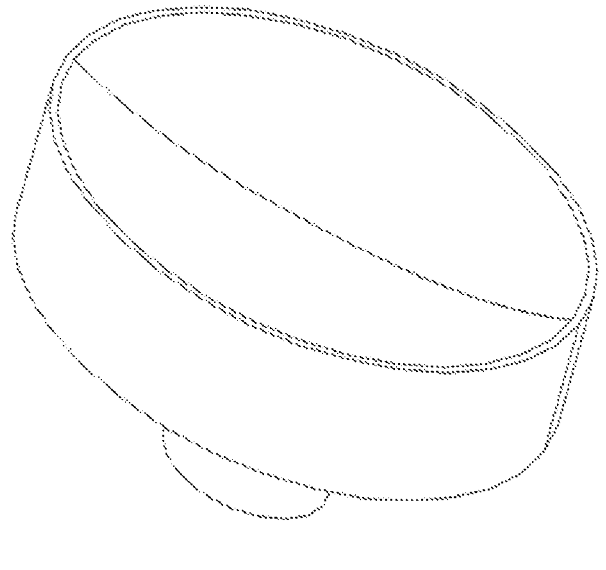
FIG. 9 is a schematic top perspective view of the upper rotating shaft of the present disclosure.
Figure 10:
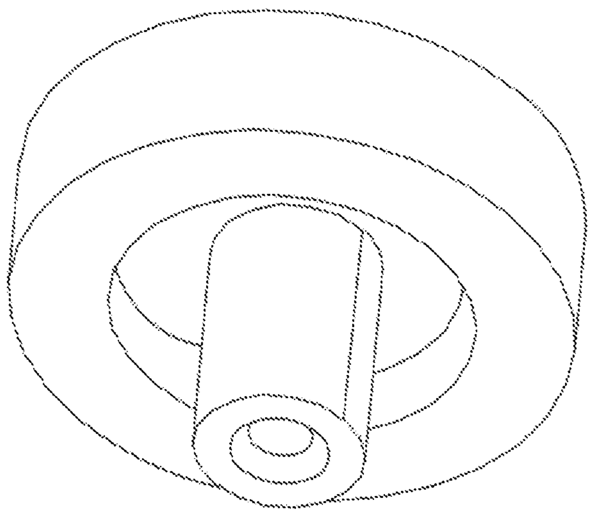
FIG. 10 is a lower perspective view of the upper rotating shaft of the present disclosure.
Figure 11:
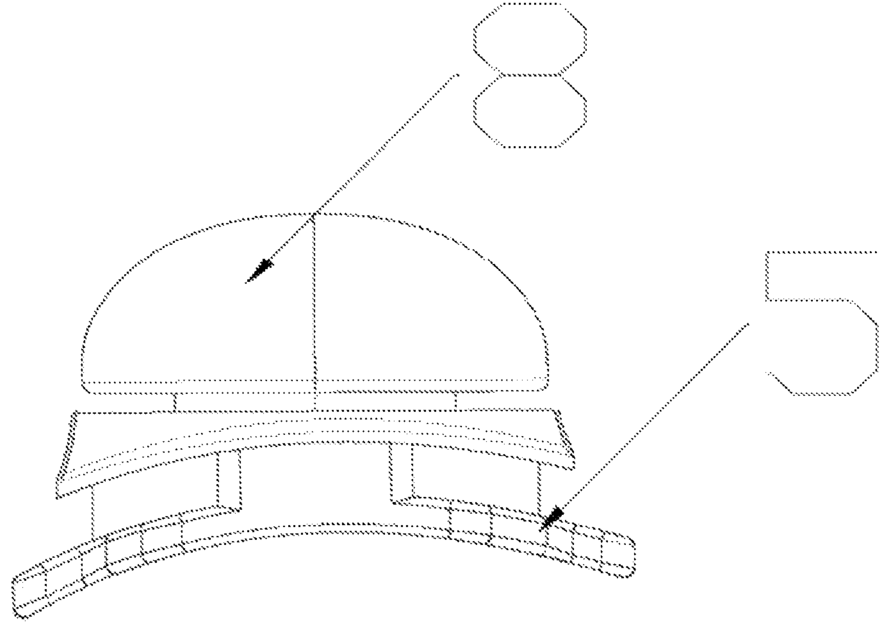
FIG. 11 is a schematic view showing a structure in which a lower rotating shaft is assembled into a rotating assembly of the present disclosure.
Figure 12:
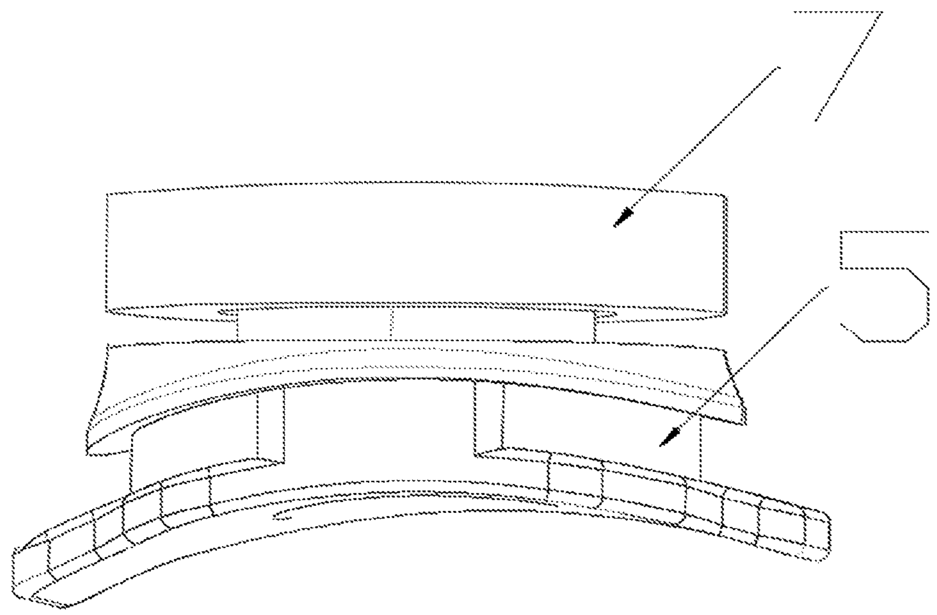
FIG. 12 is a schematic view showing a structure in which an upper rotating shaft is assembled into a rotating assembly of the present disclosure.

In FIGS. 1-12, the upper rotating assembly right piece 2 and the upper rotating assembly left piece 3 are arranged in through holes near two corners of the upper part of the mobile phone case 1, and the lower rotating assembly right piece 4 and the lower rotating assembly left piece 9 are arranged in through holes near two corners of the lower portion of the mobile phone case 1.

The upper rotating assembly right piece 2 and the upper rotating assembly left piece 3 (see FIG. 5) are composed of a bearing seat 5, a bearing 6 and an upper rotating shaft 7, wherein the bearing 6 is mounted in the bearing seat 5, the bearing shaft of the upper rotating shaft 7 is mounted in the inner hole of the bearing 6, the top surface of the upper rotating shaft 7 is a spherical concave boss, the centre of the back surface of the spherical concave boss is provided with a bearing shaft, the periphery of the bearing shaft is provided with a groove A, and the bearing seat 6 is clamped on the boss in the through hole on the mobile phone case 1.

The right piece 4 of the lower rotating assembly and the left piece 9 of the rotating assembly (see FIG. 6) are composed of a bearing seat 5, a bearing 6 and a lower rotating shaft 8, wherein the bearing 6 is mounted in the bearing seat 5, the bearing shaft of the lower rotating shaft 8 is mounted in the inner hole of the bearing 6, the top surface of the lower rotating shaft 8 is a hemisphere, the other surface is provided with a bearing shaft, a groove B is provided around the bearing shaft, and the bearing seat 6 is clamped and mounted on a boss in a through hole on the mobile phone case 1.

The inner diameters of the grooves A and B are both larger than the outer diameter of the bearing 6.

The bottom surface of the bearing seat 5 is in an arc shape close to the fillet arc of the corner of the mobile phone, the outer side surface of the bearing hole of the bearing seat 5 is in a circular shape and is provided with a groove, and the bearing seat 5 is clamped on the bosses in the through holes of the four corners of the mobile phone case 1.

The intersection point of the rotating shaft centre line of the rotating assembly and the mobile phone case may be at any one of the top and bottom surfaces of the mobile phone case and a corner portion.

In use, when the mobile phone case is placed in a vertical diagonal direction, the lower hand or other objects bear against it, the upper hand is pressed and fixed by finger, the finger is used to give a rotational force to the mobile phone, so that the mobile phone is stopped after rotating for several turns, or the upper finger is continuously swung to give it a permanent rotational force to achieve a cyclic rotation, thus achieving the effect of playing a gyro.

Although the present disclosure has been described in detail with reference to the foregoing embodiments, it will be apparent to those skilled in the art that various changes may be made in the embodiments described above, and equivalents may be substituted for elements thereof. Thus, it is intended that the present disclosure covers the modifications and variations of this disclosure provided they come within the scope of the appended claims and their equivalents.

What is claimed is:

1. A mobile phone case with gyro function, comprising:

a mobile phone case having four corners and defining a diagonal between two opposite corners and at least a pair of rotating assemblies respectively arranged at said two opposite corners;

wherein each rotating assembly comprises a bearing seat, a bearing and a rotating shaft, wherein the bearing is mounted on the bearing seat, the rotating shaft is mounted in a bearing hole of the bearing seat, wherein the rotating shafts of the rotating assemblies at said opposite corners are coaxial along said diagonal of the mobile phone case so as to define a rotation axis for rotating the mobile phone case as a whole about the diagonal, and wherein each rotating assembly is located at an inner side of the diagonal of the mobile phone.

2. The mobile phone case with gyro function according to claim 1, wherein a bottom surface of the bearing seat is arc-shaped close to the corner fillet arc of the mobile phone case; an outer side surface of the bearing hole at a bottom of the bearing seat is circular and is provided with an annular groove; an annular boss is provided in the through hole on the mobile phone case; and the annular groove of the outer side surface of the bearing seat is clamped on annular boss in the through hole on the mobile phone case.

3. The mobile phone case with gyro function according to claim 1, wherein the rotating shaft of the pair of rotating assemblies respectively comprise an upper rotating shaft and a lower rotating shaft, a top surface of the upper rotating shaft forms a spherical concave boss configured as a finger-pressing operation surface, a centre of a back surface of the spherical concave boss is provided with a bearing shaft, and a groove A is provided around the bearing shaft; a top surface of the lower rotating shaft is hemispherical for supporting rotation of the mobile phone case, a bearing shaft is provided at the centre of a hemisphere's bottom surface, a groove B is provided around the bearing shaft, and the inner diameters of the groove A and the groove B are both greater than an outer diameter of the bearing.

4. The mobile phone case with gyro function according to claim 1, wherein an intersection point of a centre line of the rotating shaft of the rotating assembly and the mobile phone case is at any one of a top surface, a bottom surface of the mobile phone case and a corner portion.

5. The mobile phone case with gyro function according to claim 1, wherein a through hole is provided at each of four corners of the mobile phone case, and a rotating assembly is provided in each of the through holes.

* * * * *